May 14, 1946.                L. BIRKIGT                2,400,068
                              POWER PLANT
                           Filed Oct. 3, 1941
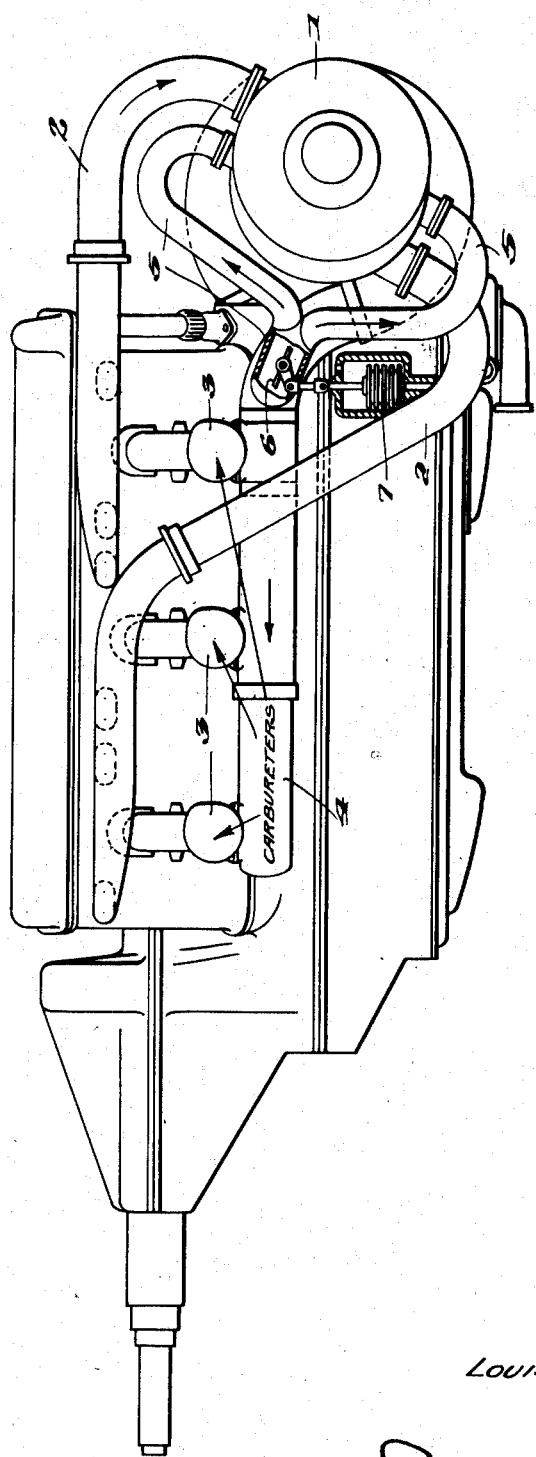
Inventor
LOUIS BIRKIGT,
By Robert B. Pearson
                Attorney Patented May 14, 1946

2,400,068

UNITED STATES PATENT OFFICE 2,400,068

POWER PLANT

Louis Birkigt, Versoix, near Geneva, Switzerland

Application October 3, 1941, Serial No. 413,526
In France November 16, 1939

3 Claims. (Cl. 60—13)

The present invention relates to power plants of the type which includes a turbine and compressor system for feeding air to the engine cylinders, and more especially this invention relates to power plants adapted to be used on aircrafts.

The object of the present invention is to provide a power plant of this type which is better adapted to meet the requirements of practice.

According to an essential feature of the invention, the system above mentioned, including a power plant, a compressor for feeding air to said plant, and a turbine driven by the exhaust gases from the power plant adapted to operate said compressor, is provided with means for cooling said turbine, and the turbine cooling means being placed under the control of correcting means which are responsive to variations of the external conditions that are liable to modify the cooling requirements.

Other features of the present invention will become more apparent from the following detailed description of a specific embodiment thereof when read in the light of the accompanying drawing which is given merely by way of example, and in which:

The figure is an elevational view of the system showing an internal combustion engine and a turbo-compressor group, with cooling means, the whole being constructed according to the invention.

In the following description with reference to the drawing, it will be supposed that the invention is applied to the case of an airplane power plant including a turbine and compressor system for the purposes above referred to.

The general construction of the system is of any suitable kind, and in particular it comprises the following elements:

a. A turbine and compressor group illustrated by the reference numeral 1, in which the turbine is fed with the exhaust gases from the engine through conduits such as 2, while the compressor serves to the feed of the engine. This compressor is suitably combined with one or several carburetters 3. The carburetters may be mounted so that air is drawn, or, as shown, forced therethrough, from a discharge pipe 4, connected with the compressor.

b. A system for cooling the turbine elements, consisting for instance, according to a known arrangement, of a branch conduit or conduits 5, starting from the compressed air circuit from the compressor, for instance from conduit 4. This system is adapted to convey the cooling air, with the suitable rate of flow, to the turbine.

Now, according to the present invention, I provide, in connection with this cooling system, correcting means, responsive to variations of the external conditions liable to modify the cooling requirements of said turbine.

It is known, in fact, that the amount of work required from the turbine decreases with the altitude, same as the temperature of the exhaust gases.

Therefore, the above mentioned correcting means will be arranged in such manner as to reduce the cooling action, when the altitude increases, for instance by reducing the rate of flow of cooling air to be passed to the turbine.

At the same time, it becomes possible, when flying at high altitude, to recuperate a portion of said flow of air, to the benefit of the engine intake circuit.

In order to make these correcting means, I may proceed in various manners. For example, and according to the simplest arrangement, I make use of a throttle valve 6 mounted in the cooling circuit, and in particular in branch conduit 5.

This throttle valve is controlled, for instance, as follows:

a. A manometric element 7, influenced by the variations of the atmospheric pressure around the power plant.

In the example illustrated by the drawing, it will be understood that the arrangement must be such that the throttle valve closes gradually as a function of the altitude, thus creating a pressure drop which tends to reduce the rate of flow of the cooling air stream.

From the above remarks it is seen that I have developed a system the working of which results sufficiently clearly from the preceding description for making it unnecessary to enter into further explanations.

This device has, over similar devices used up to the present time, in connection with power plants, many advantages, the most important of which is that it permits of fixing in a very accurate manner the temperature of the driving rotor of the turbine and compressor group.

In a general manner, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the accompanying claims.

What I claim is:

1. A power plant which comprises, in combination, an internal combustion engine, a compressor for feeding air to said engine, a turbine, said turbine being adapted to be coupled with and to drive said compressor, said turbine being fed by the exhaust gases from said engine, means for conveying a portion of the air fed by said compressor directly to said turbine for cooling said turbine, means for controlling the rate of flow of said stream of cooling air, and means responsive to variations of the atmospheric pressure surrounding said power plant adapted to adjust said controlling means in accordance with said pressure whereby said controlling means acts to diminish the amount of air admitted to said turbine as the altitude of said plant is increased.

2. A power plant which comprises, in combination, an internal combustion engine, a compressor for feeding air to said engine, a turbine adapted to be coupled with and to drive said compressor, said turbine being fed by the exhaust gases from said engine, at least one conduit branching off from the compressor outlet and leading to said turbine so as to convey a portion of the air supplied by said compressor to said turbine for cooling said turbine, valve means for controlling the flow of cooling air through said conduit, and manometric means responsive to variations of the external atmosphere around said power plant, said manometric means being adapted to operate said valve means whereby said controlling means acts to diminish the amount of air admitted to said turbine as the altitude of said plant is increased.

3. A power plant which comprises, in combination, an internal combustion engine, a compressor for feeding air to said engine, a turbine adapted to be coupled with and to drive said compressor, said turbine being fed by the exhaust gases from said engine, at least one conduit branching off from the compressor outlet and leading to said turbine so as to convey a portion of the air supplied by said compressor to said turbine for cooling it, valve means for controlling the flow of cooling air through said conduit, a manometric box deformable in response to variations of the atmospheric pressure surrounding said power plant, and mechanical means interposed between said box and said valve means for operating the latter in accordance with the value of said atmospheric pressure whereby said controlling means acts to diminish the amount of air admitted to said turbine as the altitude of said plant is increased.

LOUIS BIRKIGT.